May 2, 1961  R. T. BUDD ET AL  2,982,655
MANUFACTURE OF CHEESE
Filed Sept. 9, 1959  3 Sheets-Sheet 1
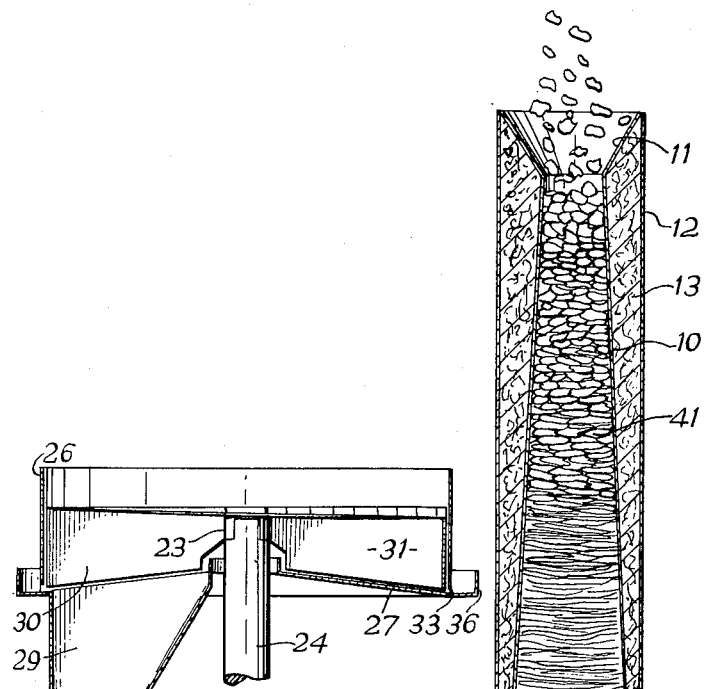
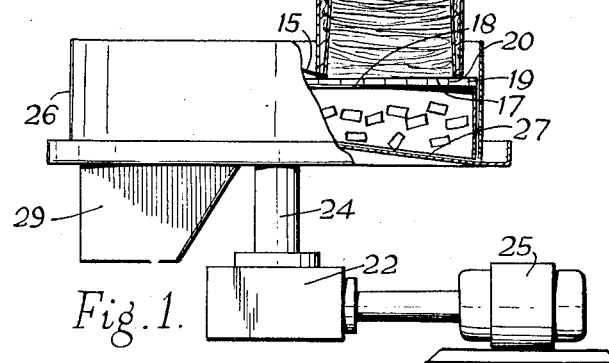
INVENTORS
RICHARD THOMAS BUDD
HELEN RHODA CHAPMAN
BY
ATTORNEY May 2, 1961   R. T. BUDD ET AL   2,982,655
MANUFACTURE OF CHEESE
Filed Sept. 9, 1959   3 Sheets-Sheet 2
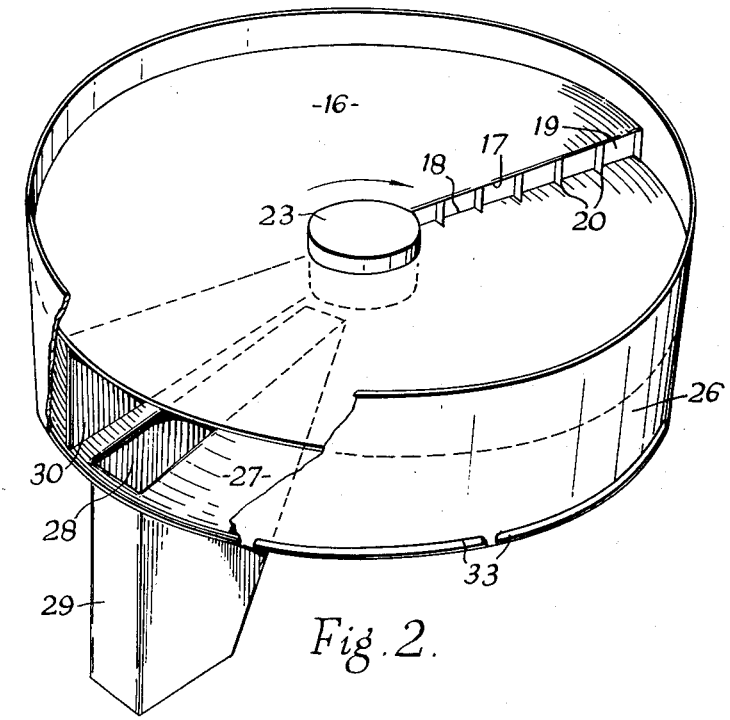
Fig. 2.
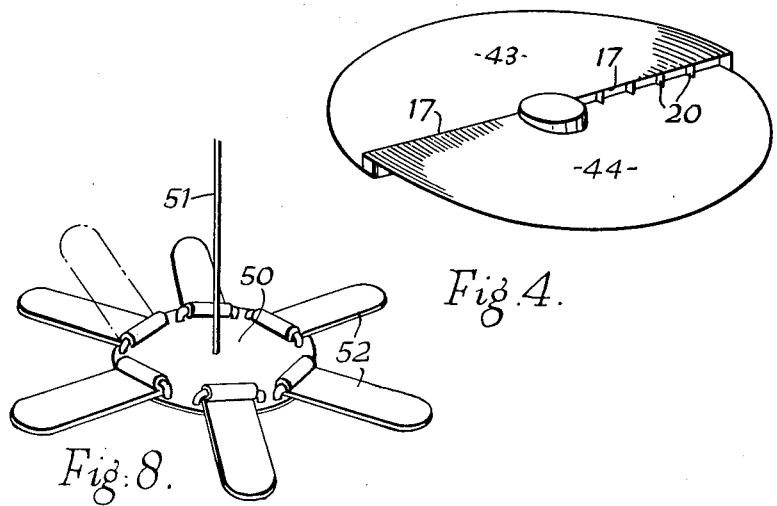
Fig. 4.
Fig. 8.
INVENTORS
RICHARD THOMAS BUDD
HELEN RHODA CHAPMAN
BY
Larson and Taylor
ATTORNEY May 2, 1961 R. T. BUDD ET AL 2,982,655
MANUFACTURE OF CHEESE
Filed Sept. 9, 1959 3 Sheets-Sheet 3
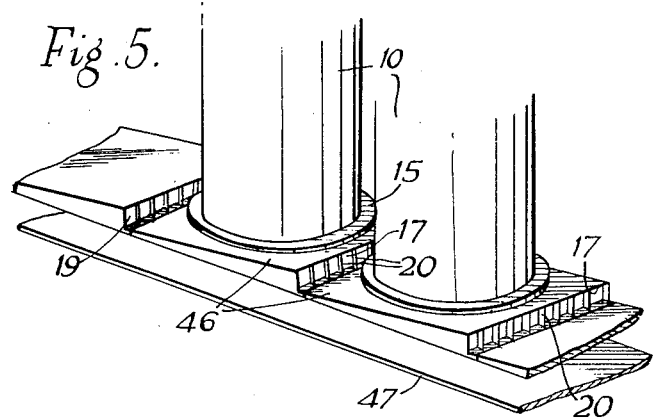
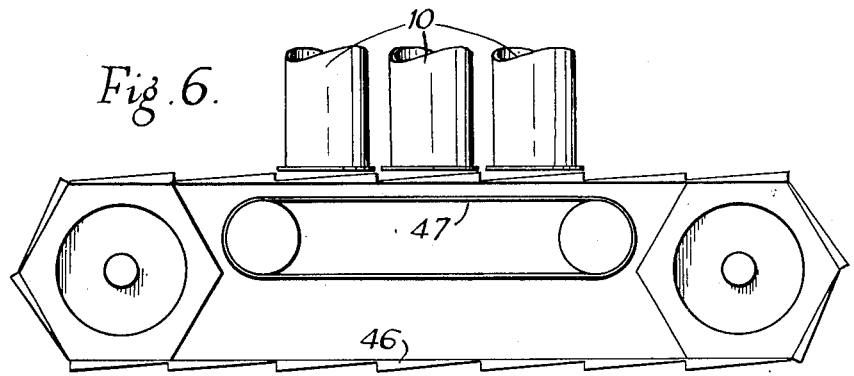
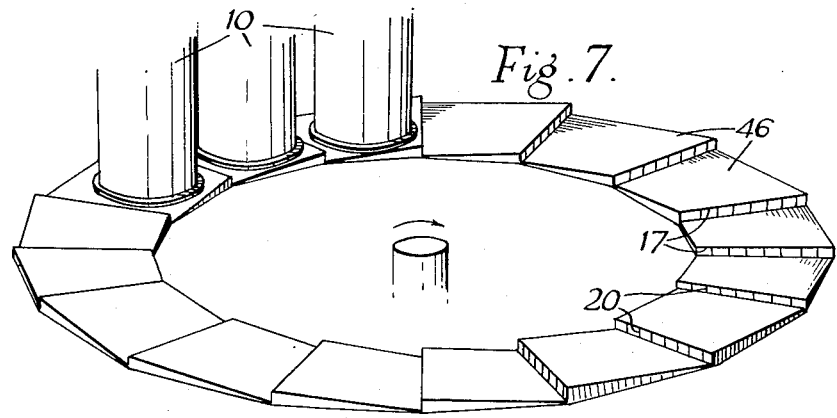
INVENTORS
RICHARD THOMAS BUDD
HELEN RHODA CHAPMAN
BY
Larson and Taylor
ATTORNEY United States Patent Office 2,982,655
Patented May 2, 1961

2,982,655
MANUFACTURE OF CHEESE
Richard T. Budd and Helen R. Chapman, Shinfield, Reading, England, assignors to National Research Development Corporation, London, England, a corporation of Great Britain Filed Sept. 9, 1959, Ser. No. 838,926
Claims priority, application Great Britain Sept. 11, 1958
17 Claims. (Cl. 99—116)

This invention relates to processes involved in the production of cheese and to apparatus for carrying out the processes. In the production of cheese, milk is treated to form a curd which is separated from the whey and subjected to a further treatment prior to salting and hooping. In the particular case of the manufacture of Cheddar cheese this treatment is known as the cheddaring process and is carried out as follows:

The curd particles are allowed to settle in the bottom of the curd making vat or in a separate curd cooler and the free whey is drawn off. The resultant single block of curd is channelled through the centre and then cut into smaller blocks which, at regular intervals over a period up to two hours, are turned upside down and gradually stacked one on top of another into piles. These operations may be performed manually or by machine. During the process several actions are occurring, viz. whey is continuing to drain off, acidity of the curd is developing, the curd particles are being consolidated into a continuous mass and deformation of the curd is taking place, the blocks tending to spread sideways under the weight of the piles.

The objects of the invention are to produce the cheddaring or similar actions above described in a simplified manner, to reduce the amount of manual and/or mechanical effort required and to facilitate the replacement of the existing batch process by a continuous one.

According to the invention, the process comprises feeding curd to the upper part of an upright column in which form the curd is confined and down which it flows by its own weight, supporting the curd at the lower end of the column and removing curd from the lower end thereof at such a rate that cheese of a required body, texture, moisture content and acidity is produced. The curd may be fed continuously to the top of the column while treated curd is removed continuously from the bottom of the column. The column is preferably tapered with the larger end lowermost and may be confined by means of an imperforate vertical tube which may be lagged against loss of heat. The free whey escapes at the lower end of the tube mainly between the tube and the column of curd. The curd is forced outwards towards the walls of the tube and it is thought that the whey forms a lubricating film on the walls of the tube and escapes with the curd at the bottom.

The invention will now be further described with reference to the accompanying drawings wherein:

Figure 1 is a vertical sectional view of an apparatus made in accordance with the invention;

Figure 2 is a perspective view of the lower part thereof;

Figure 3 is a sectional view of the parts shown in Figure 2 but showing a modification;

Figure 4 is a perspective view of part of a modified form of the apparatus;

Figures 5, 6 and 7 are views showing modified forms of apparatus; and

Figure 8 is a perspective view of an ancillary device to be described.

Referring first to Figure 1 to 3, a vertical metal tube 10 is tapered so that its lower end is larger than its upper end. A tapered funnel 11 is fitted to the upper end of the tube to facilitate feeding of curd to the tube. A tubular casing 12 of constant diameter surrounds the tube 10 leaving a space which is filled with asbestos, glass fibres, or other lagging 13 to retain heat in the contents of the tube 10.

The lower end of the tube 10 is fitted with a thin metal ring 15 which is turned up at one side to facilitate entry of a knife blade beneath the tube. This knife blade is formed by an helically shaped metal plate 16 having a slight inclination to the horizontal and having a radial knife edge 17 spaced from the opposite radial edge 18 to form a slot 19. This slot is divided at intervals by vertical knife blades 20. The plate 16 is fixed to a boss 23 which is detachably fixed to a spindle 24 which is driven by an electric motor 25 or other means at a variable predetermined speed through a variable ratio gearbox 22.

Surrounding the spindle is a cylindrical tray 26 having a conical bottom 27 provided with a discharge opening 28 leading to a discharge chute 29. Vanes 30, 31 are fixed to the underneath of the plate 16 and have inclined lower edges corresponding to the conical bottom 27 and serving to sweep cut curd into the opening 28 and chute 29. Slots 33 are provided around the periphery of the bottom 27 to permit escape of whey, and a whey collecting tray 36 may be provided as shown in Figure 3.

In carrying out a cheddaring or similar process in accordance with the invention, the procedure may be as follows:

A mixture of curds and whey is maintained in agitated condition to avoid settling. When the normal stage of drawing off the whey is reached the mixture is fed to a curd separator.

The acidity of the curd may be such that the curd contains 0.16 to 0.22 percent by volume of lactic acid ascertained by titration. The temperature of the curd is preferably about 90 to 105 degrees Fahrenheit.

The moisture content of the finished cheese can be controlled in known manner in the course of producing the curd to be fed to the tube.

The curd is fed at a constant rate at 11 to the upper end of the tube and fills the tube 10 to form a column of curd of progressively more cohesive and fibrous texture towards the lower end where it achieves the required body or firmness and the required texture of cut surface. The column rests on the plate 16 which is slowly rotated, e.g. 1 to 2 revolutions per minute so that the knife edge 17 cuts a thin slice off the lower end of the column at each revolution, this thin slice being divided into fingers or chips by the knife blades 20. The rate of removal of the treated curd is equal to the rate of feed to the top of the tube. The chips are swept by the blades 30, 31 into the chute 29 and they are removed for salting and hooping to produce the finished cheese. In this way a continuously moving column of curd is produced and cheddaring or similar action is achieved by (a) consolidation of the curd caused by increasing pressure (due to the weight of the curd) towards the bottom of the tube, the particles of curd becoming joined together to form a curd mass of Cheddar-like texture; (b) sideways spread of the curd made possible by the increasing cross-sectional area; and (c) development of acidity during the time taken to flow through the tube. Drainage of whey takes place mainly through the gap formed between the outside surface of the curd column and the inside of the tube. The temperature of the curd in the column is maintained at 80 to 105° F. The acidity of the cheddared curd is such that it contains 0.45 to 0.95 percent of lactic acid.

The process may be arranged so that the batches of curds and whey in a number of vats are successively reaching the required state of acidity and/or firmness in order to maintain a continuous flow through the tube.

Figure 4 shows a modification in which the plate 16 is replaced by two plates 43, 44 providing two sets of knife edges 17, 20 facing in the same rotary direction so as to cut two slices per revolution.

Figures 5 and 6 show a modified construction in which the plate 16 is replaced by a series of inclined plates 46 in step-like form with the knife edges 17, 20 and slot 19 at the risers of the steps, the plates forming an endless belt. The belt may have a slight camber to run off whey at the sides. The treated curd is carried away by an endless collecting belt 47. The cutter may serve for a plurality of tubes 10.

As shown in Figure 7 the step-like device can be made circular and large enough to accommodate two or more tubes 10.

Advantages of the invention include the following:

(1) It can be used with any existing type of curd-making equipment.
(2) Handling of the curd is considerably reduced, thereby reducing the labour and/or power requirements.
(3) The use of a separate milling operation is avoided.
(4) It enables the salting and hooping stages to be organised on a continuous basis instead of in batches.
(5) In factories where the cheddaring is carried out in the making vat, the process would release the vat for further use at an early stage.
(6) In factories where the cheddaring is carried out in separate curd coolers, use of the process could reduce the amount of floor space required.
(7) Since the treatment is carried out in a closed vessel, the risk of air-borne contamination is considerably reduced, and manual contamination is avoided.
(8) The total time of the cheddaring or similar process can be reduced.
(9) Reduction of the time of the cheddaring or like process facilitates the use of single strain starters which develop acidity at a faster rate than the usual types. This further enables the adoption of a technique designed to overcome attacks by bacteriophage.
(10) A more uniform or controllable product is obtained.

The tube 10 when used for true cheddaring requires to have a cross-sectional area which increases from top to bottom. An edible cheese can be made with a tube of constant diameter, the texture being between that of a Cheddar and a Cheshire. Normally a tapered tube is used. The rate of increase may be linear resulting in a simple taper tube but it may be such as to produce a flared-type bottom.

The actual ratio of top to bottom cross-sectional areas is dependent on the amount of spread of the curd which is required. During traditional cheddaring, a piece of curd will increase its superficial area by a factor of three or four—sometimes more, sometimes less. The factor will depend on a number of conditions, viz. the nature of the curd itself, the size of the blocks into which it is cut, how deep it is piled, whether extra weight is applied and how much, and the length of time for which the cheddaring is continued. Although this spread is essential for the cheddaring action, measurement of it is not made as an assessment of curd quality.

In practice, a figure from four to five to one increase of area has been found convenient. An increase of area of less than 3 or greater than 7 may introduce undesirable difficulties.

The maximum pressure to which the curd is subjected depends on the height of the tube and the density of the curd, and the latter depends on the curd preparation. In the traditional process, the maximum pressure is of the order of one-tenth to one-quarter lb./sq. in. In some mechanical cheddaring machines where the sideways spread is restricted, pressures of 8 lb./sq. in. are used. The condition of restricted sideways spread is made because there is a danger with high pressure on unrestricted curd of shearing the curd particles with resultant loss of fat. Experience has shown that a tube 6 ft. high producing a maximum pressure of about 2 lb./sq. in. is satisfactory. It is considered that a tube of height 3 to 10 feet or generally 5 to 10 ft. and top area to bottom area ratio of 1 to 4–6 would be suitable and convenient for general use.

The volume of the tube is governed by the required rate of throughput and the length of time it is required to continue the cheddaring action. Having fixed the height and top/bottom cross-section area ratio, the volume determines the actual cross-sectional dimensions. There may be a maximum limit to these dimensions determined by the ability of the whey to drain out of a large mass of curd and difficulty of cutting.

The internal surface of the tube should be smooth and clear of any projections which might impede the flow of curd.

If desired, the tube may be surrounded by a heating means instead of or in addition to the lagging.

The separation of curds from whey and delivery of the curd to the tube may be effected as follows: The curd particles are still fragile and care must be taken to avoid damage and consequent loss of fat. Furthermore, once the curd particles have been separated from the whey there is a greater tendency for them to stick together to form lumps and to adhere to the surface of their container. Handling of the separated curd then becomes more difficult. Without the whey to keep it warm the curd will also lose heat more rapidly and development of acidity will slow down. It is therefore recommended that separation of the whey from the curd should be carried out as near as possible to the top of the tube. There are existing pumps which will handle curds and whey mixture satisfactorily without damage to the curd. These could be used to raise the contents of the curd making vat to the required level.

The actual separation could be carried out using an agitating wire mesh such as a Russell separator or an inclined rotary cylindrical sieve. Curds and whey are fed into the upper end of the cylinder, the whey drains out through the perforations and the curd particles eventually tumble out of the lower end.

Initial filling of the tube at the start of a run presents a problem. Each discrete quantity of curd must take the same time to travel through the tube and be subjected to the same rates of pressure increase and spread for the curd to be properly and uniformly cheddared. This presents no problem when the tube is full and curd is being fed to the top at the same rate at which the treated curd is being removed at the bottom. There is the problem at the start, when the first curd is presented to the empty tube, of filling the tube to produce a continuously moving column of curd. This stage may be carried out in several ways. For example:

(a) The curd is delivered into the top of the tube, falls down to the bottom and is supported by the stationary cutter. When the tube is full the cutter is set in motion and the curd is removed at the normal rate. The first curd to come through will not be cheddared but subsequently the curd will become increasingly better cheddared until the last of the initial filling has passed through. At that point, properly treated curd will start to issue. The early curd can be dealt with as desired but need not be wasted and need form only a small proportion of the total curd handled.

(b) The tube may be filled initially with an inert substance which can be removed at the same rate as curd by the cutter. The first curd to go in is thus supported and undergoes the complete treatment during its passage through the tube. Only the curd in immediate contact with the supporting substance may need to be rejected. The substance used need not be continuous but could be in the form of small particles or pellets. It should be easily removable by the cutter without damaging the cutting blades. The inert substance may be small polythene pellets.

(c) A curd support as shown in Figure 8 can be used consisting of a disc 50 which lies flat and covers the cross-sectional area of the top of the tube and is retained at any vertical level in the tube by means of a wire 51 attached to its centre of area. The curd is delivered in the normal way while the support is lowered through the tube at a rate corresponding to the normal flow. Arms 52 pivoted to the disc project radially from the disc to the wall of the tube and provide support to the curd as the cross-section of the tube increases. When the cutter is reached the support can be disconnected from the retaining wire and taken out of the tube. The wire can be withdrawn upwards through the curd and out at the top. Again, as in (b), all the curd is given the full cheddaring treatment and there is no waste.

(d) At a convenient number of points down the tube, horizontal plates could be held in place and prevented from falling by pegs which may be retracted through the wall of the tube. In operation, curd would be emptied into the tube until it filled the top section. The pegs supporting the uppermost plate would then be withdrawn, allowing the plate and the curd to fall to the level of the next plate. As the tube becomes full again, the pins holding the next plate would be withdrawn and so on until the bottom is reached where all the plates would have to be removed. The cheddaring action is discontinuous but this should not be important at this stage.

Having run the process continuously, the stage will be reached when no further separated curd is available to feed to the tube. There is, therefore, no further weight available to provide the cheddaring force to the curd remaining in the tube. The problem may be overcome by the addition of weight in some form or other at a rate equivalent to that at which the curd enters the tube.

A long, tubular, flexible plastic bag of the same maximum diameter as the tube and into which water is poured at a suitable rate can be dropped inside the tube to rest on top of the curd. As the curd moves down, the bag will follow and maintain pressure on the curd. When near the bottom of the tube it is necessary to stop the cutting and remove the bag to prevent it being damaged by the blades. Weight can also be applied in the form of pellets of a dense inert material—on a small scale, pebbles were used.

An alternative method is to seal off the tube at the top and supply compressed air at a suitable low pressure.

We claim:

1. A continuous process for making cheese comprising feeding curd into the upper part of an upright column in which the curd is confined and down which it flows by its own weight, supporting the curd at the lower end of the column and removing portions of treated curd from the lower end of the column while maintaining a main body of curd in the column and controlling the rate of removal so that the curd is treated to produce cheese of required body, texture, moisture content and acidity as the curd flows down through the column.

2. A process for making cheese as claimed in claim 1, wherein the column is tapered to permit growth of the curd as it flows down through the column.

3. A process as claimed in claim 2 wherein the column is insulated to reduce loss of heat.

4. A process as claimed in claim 2, wherein the tube has an area at its lower end from 3 to 7 times the area of its upper end.

5. A process as claimed in claim 1, wherein the column is tapered, curd is fed continuously to the upper end thereof at a temperature of from 90 to 105° F. and an acidity equal to 0.16 to 0.22 percent lactic acid by volume, and the curd is removed continuously from the lower end at an acidity of .45 to .95 percent lactic acid, the height of the column being 3 to 10 feet.

6. A process as claimed in claim 1, wherein the curd is removed by cutting thin slices from the lower end of the column.

7. A process as claimed in claim 1, wherein the curd is removed from the bottom of the tube at the same rate as it is fed to the top of the tube.

8. A process as claimed in claim 1, wherein the cheese curd from the bottom of the column is salted and hooped.

9. Apparatus for making cheese comprising an upright tapered metal tube 3 to 10 feet high, the area of the lower end of said tube being greater than the area of the top, temperature control means for controlling the temperature of curd passing through the tube, means at the lower end of the tube for supporting the curd in the tube and for cutting off the lower end of the column of curd in the tube at a predetermined rate.

10. Apparatus as claimed in claim 9, wherein the temperature control means consists of insulating lagging.

11. Apparatus as claimed in claim 9, wherein the supporting and cutting means comprises a disc having a radial cutting edge and a slot to receive the cut off curd.

12. Apparatus as claimed in claim 9, wherein the supporting and cutting means comprises a disc having at least two radial cutting edges over slots, the disc being made of inclined parts between the cutting edges.

13. Apparatus as claimed in claim 9, wherein the supporting and cutting means comprises a series of inclined step-like plates with cutting edges and slots at the steps.

14. Apparatus as claimed in claim 9, wherein the supporting and cutting means is in the form of an endless belt.

15. Apparatus as claimed in claim 9, wherein the cutting means includes a long cutting edge for cutting a slice from the curd and a series of short cutting blades for cutting the slice into separate fingers.

16. Apparatus as claimed in claim 9, wherein the cut off curd falls on to a support having a discharge opening therein and a moving blade pushes the curd over the support into said opening.

17. Apparatus as claimed in claim 9, wherein at least two such tubes have a common curd supporting and cutting means.

References Cited in the file of this patent

UNITED STATES PATENTS

| | | |
|---|---|---|
| Re. 21,834 | Miollis | June 17, 1941 |
| 2,462,105 | Kobey | Feb. 22, 1949 |
| 2,590,987 | Magnuson | Apr. 1, 1952 |
| 2,603,868 | Young et al. | July 22, 1952 |